(12) United States Patent
Heathco

(10) Patent No.: US 9,261,019 B2
(45) Date of Patent: Feb. 16, 2016

(54) VARIABLE CYCLE GAS TURBINE ENGINE

(75) Inventor: Craig Heathco, Martinsville, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 646 days.

(21) Appl. No.: 13/337,924

(22) Filed: Dec. 27, 2011

(65) Prior Publication Data
US 2012/0233980 A1 Sep. 20, 2012

Related U.S. Application Data

(60) Provisional application No. 61/428,727, filed on Dec. 30, 2010.

(51) Int. Cl.
| F02C 9/16 | (2006.01) |
| F02C 1/00 | (2006.01) |
| F02C 7/32 | (2006.01) |
| F02C 3/107 | (2006.01) |
| F02C 3/13 | (2006.01) |
| F02C 9/18 | (2006.01) |
| F02K 3/02 | (2006.01) |
| F02K 3/075 | (2006.01) |

(52) U.S. Cl.
CPC ............. F02C 1/007 (2013.01); F02C 3/107 (2013.01); F02C 3/13 (2013.01); F02C 7/32 (2013.01); F02C 9/18 (2013.01); F02K 3/025 (2013.01); F02K 3/075 (2013.01)

(58) Field of Classification Search
CPC .............. F02C 3/13; F02C 3/10; F02C 3/107; F02C 6/08; F02C 7/32; F02C 9/18
USPC .............. 60/778, 786, 787, 788, 39.163, 801, 60/802, 782, 785, 795
See application file for complete search history.

(56) References Cited

U.S. PATENT DOCUMENTS

| 3,520,138 | A | | 7/1970 | Fox |
| 3,548,597 | A | | 12/1970 | Etessam |
| 3,678,690 | A | | 7/1972 | Shohet et al. |
| 4,010,608 | A | * | 3/1977 | Simmons ..................... 60/226.3 |
| 5,363,641 | A | * | 11/1994 | Dixon et al. .................... 60/778 |
| 5,414,992 | A | * | 5/1995 | Glickstein ....................... 60/782 |
| 6,134,876 | A | | 10/2000 | Hines et al. |
| 6,305,156 | B1 | * | 10/2001 | Lui ................................ 60/785 |
| 7,089,744 | B2 | | 8/2006 | Epstein |
| 7,111,462 | B2 | | 9/2006 | Epstein |
| 7,231,770 | B2 | | 6/2007 | Epstein |
| 7,246,482 | B2 | * | 7/2007 | Mahoney et al. ............... 60/204 |
| 7,478,525 | B2 | * | 1/2009 | Iya et al. ......................... 60/204 |
| 7,584,600 | B2 | * | 9/2009 | Klingels .................... 60/39.183 |
| 7,805,947 | B2 | * | 10/2010 | Moulebhar ..................... 60/787 |
| 8,146,370 | B2 | * | 4/2012 | Zeiner et al. .................... 60/792 |
| 2008/0155961 | A1 | | 7/2008 | Johnson |

* cited by examiner

Primary Examiner — Steven Sutherland
(74) Attorney, Agent, or Firm — Barnes & Thornburg LLP

(57) ABSTRACT

One embodiment of the present invention is a unique variable cycle gas turbine engine. Other embodiments include apparatuses, systems, devices, hardware, methods, and combinations for variable cycle gas turbine engines. Further embodiments, forms, features, aspects, benefits, and advantages of the present application will become apparent from the description and figures provided herewith.

16 Claims, 3 Drawing Sheets

VARIABLE CYCLE GAS TURBINE ENGINE

CROSS REFERENCE TO RELATED APPLICATIONS

The present application claims benefit of U.S. Provisional Patent Application No. 61/428,727, filed Dec. 30, 2010, entitled VARIABLE CYCLE GAS TURBINE ENGINE, which is incorporated herein by reference.

FIELD OF THE INVENTION

The present invention relates to gas turbine engines, and more particularly, variable cycle gas turbine engines.

BACKGROUND

Variable cycle gas turbine engines remain an area of interest. Some existing systems have various shortcomings, drawbacks, and disadvantages relative to certain applications. Accordingly, there remains a need for further contributions in this area of technology.

SUMMARY

One embodiment of the present invention is a unique variable cycle gas turbine engine. Other embodiments include apparatuses, systems, devices, hardware, methods, and combinations for variable cycle gas turbine engines. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
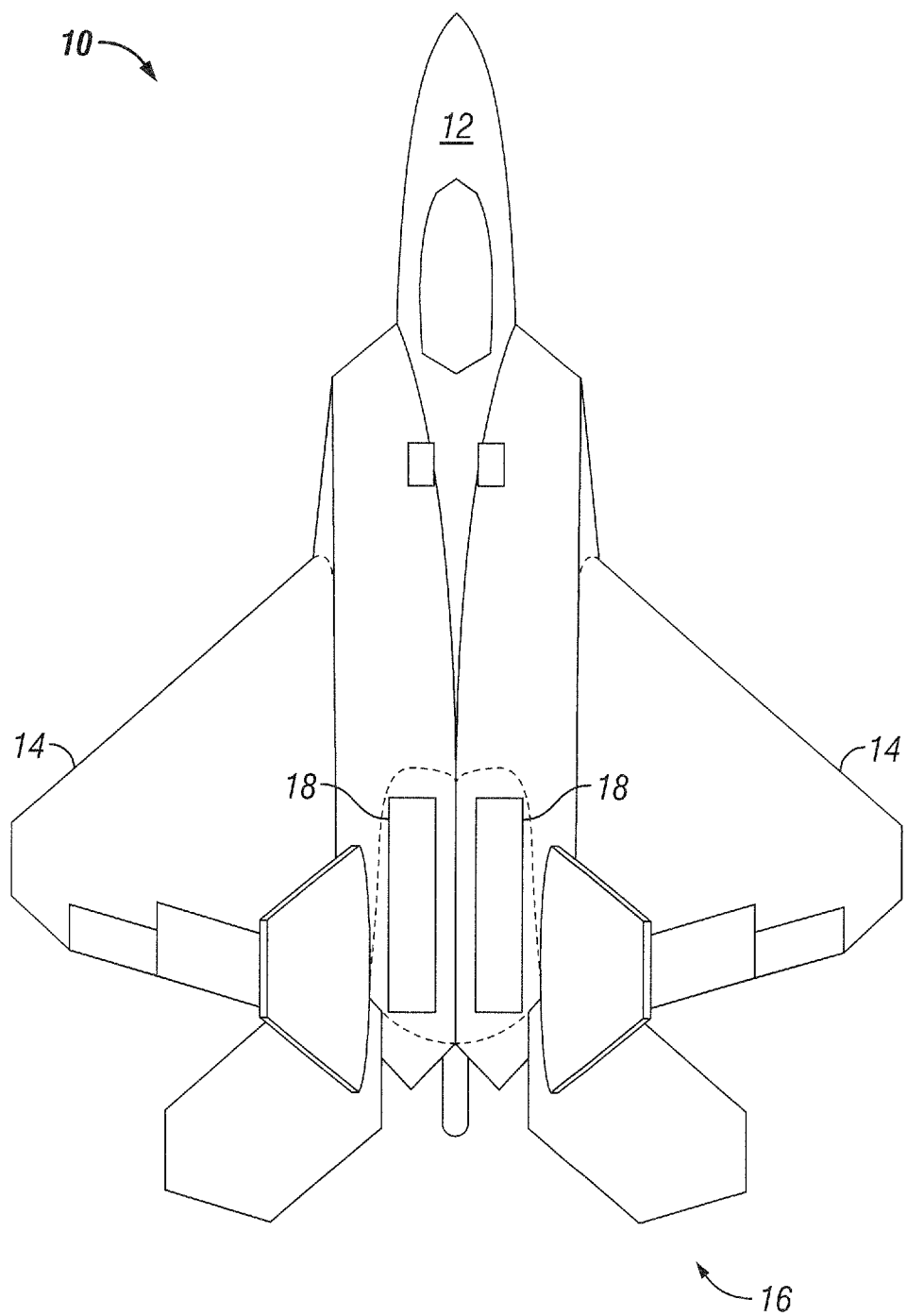
FIG. 1 illustrates some aspects of a non-limiting example of an aircraft having variable cycle gas turbine engines in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to FIG. 1, there are illustrated some aspects of a non-limiting example of an aircraft 10 in accordance with an embodiment of the present invention. Aircraft 10 includes a fuselage 12, wings 14, an empennage 16 and two propulsion systems 18. In one form, aircraft 10 is a twin engine military turbofan aircraft. In other embodiments, aircraft 10 may be any fixed-wing aircraft, including turbofan aircraft, turbojet aircraft and turboprop aircraft. In still other embodiments, aircraft 10 may be a rotary-wing aircraft or a combination rotary-wing/fixed-wing aircraft. In various embodiments, aircraft 10 may have a single propulsion engine or a plurality of propulsion engines. In addition, in various embodiments, aircraft 10 may employ any number of wings 14. Empennage 16 may employ a single or multiple flight control surfaces.

Figure 2:
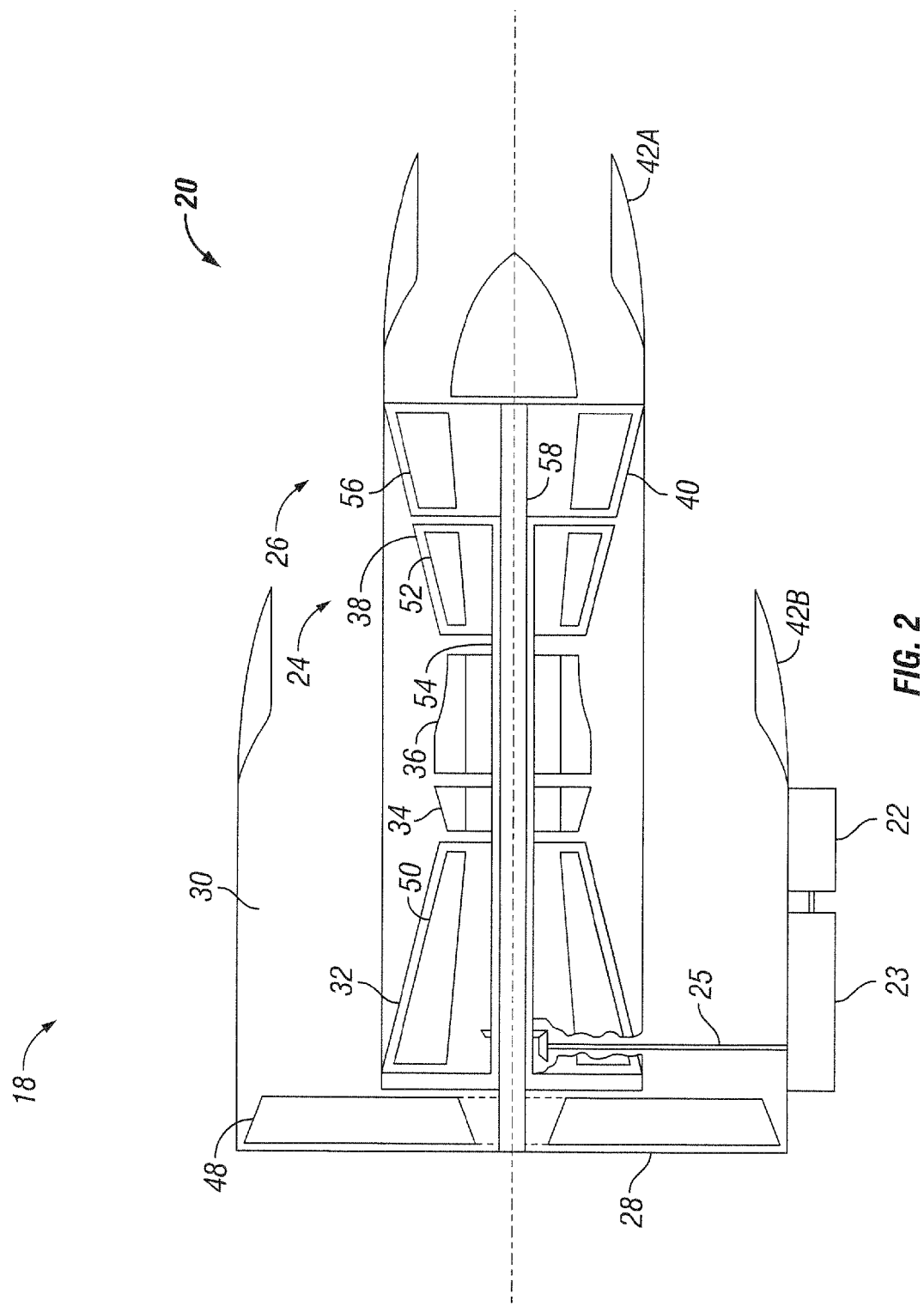
FIG. 2 schematically illustrates some aspects of a non-limiting example of a variable cycle gas turbine engine in accordance with an embodiment of the present invention.

Referring to FIG. 2, there are illustrated some aspects of a non-limiting example of a propulsion system 18 in accordance with an embodiment of the present invention. Propulsion system 18 includes a gas turbine engine 20 as a main engine, i.e., a main propulsion engine, which includes an auxiliary turbine system 22. Engine 20 is a primary propulsion engine that provides thrust for flight operations of aircraft 10. In one form, engine 20 is a two-spool engine having a high pressure (HP) spool 24 and a low pressure (LP) spool 26. In other embodiments, engine 20 may include three or more spools, for example, and may include an intermediate pressure (IP) spool and/or other spools. In one form, engine 20 is a turbofan engine, wherein LP spool 26 is operative to drive a propulsor 28 in the form of a turbofan (fan) system, which may be referred to as a turbofan, a fan or a fan system. In other embodiments, engine 20 may be a turboprop engine, wherein LP spool 26 powers a propulsor 28 in the form of a propeller system (not shown), e.g., via a reduction gearbox (not shown). In still other embodiments, propulsor 28 may take other forms, such as a helicopter rotor or tilt-wing aircraft rotor or a propfan. In one form, two propulsion systems 18 are coupled to fuselage 12 of aircraft 10. In other embodiments, one or more propulsion systems 18 may be coupled to other portions of aircraft 10. For example, one or more propulsion systems 18 may be coupled to each wing 14 and/or empennage 16 in addition to or in place of fuselage-mounted propulsion systems 18.

In one form, engine 20 includes, in addition to auxiliary turbine system 22 and fan system 28, an accessory gearbox 23, a bypass duct 30, a compressor system 32 as part of HP spool 24, a diffuser 34, a combustion system 36, a high pressure (HP) turbine 38 as part of HP spool 24, a low pressure (LP) turbine 40 as part of LP spool 26, a nozzle 42A, and a nozzle 42B. Accessory gearbox 23 is coupled to HP spool 24 and compressor 32 via conventional means, e.g., a bevel gear set and shafting 25. In other embodiments, accessory gearbox 23 may be coupled to HP spool 24 and/or LP spool 26 via other mechanical arrangements. In one form, compressor 32 is a variable compressor. In other embodiments, compressor 32 may not be a variable compressor. In one form, compressor 32 is a variable geometry compressor. In other embodiments, compressor 32 may be other types of variable compressors that may or may not employ variable geometry, e.g., including geared compressors that are configured to operate at more than one speed relative to a given shaft input speed.

Bypass duct 30 and compressor 32 are in fluid communication with fan system 28. Nozzle 42B is in fluid communication with bypass duct 30. Diffuser 34 is in fluid communication with compressor 32. Combustion system 36 is fluidly disposed between compressor 32 and HP turbine 38. LP turbine 40 is fluidly disposed between HP turbine 38 and nozzle 42B. In one form, combustion system 36 includes a combustion liner (not shown) that contains a continuous combustion process. In other embodiments, combustion system 36 may take other forms, and may be, for example, a wave rotor combustion system, a rotary valve combustion system, a pulse detonation combustion system and/or a slinger combustion system, and may employ deflagration and/or detonation combustion processes.

Fan system 28 includes a fan rotor system 48 driven by LP spool 26. In various embodiments, fan rotor system 48 includes one or more rotors (not shown) that are powered by LP turbine 40, which may operate at the same or different rotational speeds. Fan system 28 may include one or more stages of vanes (not shown). Bypass duct 30 is operative to transmit a bypass flow generated by fan system 28 around the core of engine 20. Compressor 32 includes a compressor rotor system 50. In various embodiments, compressor rotor system 50 includes one or more rotors (not shown) that are powered by HP turbine 38. HP turbine 38 includes a turbine rotor system 52. In various embodiments, turbine rotor system 52 includes one or more rotors (not shown) operative to drive compressor rotor system 50. Turbine rotor system 52 is drivingly coupled to compressor rotor system 50 via a shafting system 54. LP turbine 40 includes a turbine rotor system 56. In various embodiments, turbine rotor system 56 includes one or more rotors (not shown) operative to drive fan rotor system 48. Turbine rotor system 56 is drivingly coupled to fan rotor system 48 via a shafting system 58. In various embodiments, shafting systems 54 and 58 include a plurality of shafts that may rotate at the same or different speeds and directions. In some embodiments, only a single shaft may be employed in one or both of shafting systems 54 and 58. LP turbine 40 is operative to discharge the engine 20 core gas flow to nozzle 42A.

During the operation of gas turbine engine 20, not including the use of auxiliary turbine system 22, air is drawn into the inlet of fan system 28 and pressurized by fan rotor system 48. Some of the air pressurized by fan rotor system 48 is directed into compressor 32 as core gas flow, and some of the pressurized air is directed into bypass duct 30 as bypass flow. Compressor 32 further pressurizes the core gas flow received therein from fan system 28, which is then discharged into diffuser 34. Diffuser 34 reduces the velocity of the pressurized air, and directs the diffused core gas flow into combustion system 36. Fuel is mixed with the pressurized air in combustion system 36, which is then combusted. The core gas flow, in the form of hot gases exiting combustion system 36, are directed into HP and LP turbines 38 and 40, e.g., sequentially, which extract energy in the form of mechanical shaft power to drive compressor 32 and fan 28 via respective shafting systems 54 and 58. In the depicted embodiment, the engine 20 core flow is discharged through nozzle 42A, and the bypass flow is discharged through nozzle 42B. In other embodiments, other nozzle arrangements may be employed, e.g., a common nozzle for core and bypass flow; a nozzle for core flow, but no nozzle for bypass flow; or another nozzle arrangement.

It is desirable that engine 20 product peak thrust output during aircraft 10 takeoff, and during some aircraft 10 maneuvering operations. In addition, it is desirable that engine 20 operate at high efficiency during cruise conditions, including supercruise conditions, i.e., supersonic cruise without the use of thrust augmentation (e.g., afterburners). Conventionally, a fixed geometry gas turbine engine sized for takeoff thrust conditions yields a greater than ideal specific fuel consumption during cruise conditions because the engine is running at an "off-design" point during cruise conditions. On the other hand, a fixed geometry gas turbine sized for peak efficiency during cruise conditions may have insufficient thrust for desirable takeoff and maneuver performance. In order to maximize thrust at high power, e.g., takeoff and maneuver conditions, engine 20 is configured as a variable cycle gas turbine engine. In particular, engine 20 employs auxiliary turbine system 22 for selectively expanding and contracting the turbine flow capacity of engine 20. In some embodiments, compressor 32 may be variable, e.g., a variable geometry compressor, which in conjunction with auxiliary turbine system 22 further enhances the cycle variability of engine 20.

Figure 3:
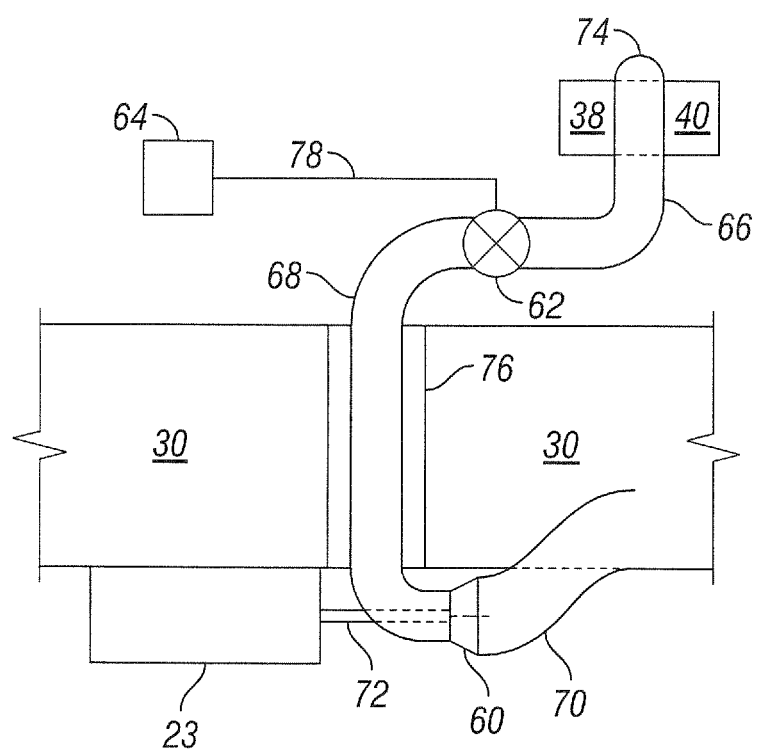
FIG. 3 schematically illustrates some aspects of a non-limiting example of an auxiliary turbine system in accordance with an embodiment of the present invention.

Referring to FIG. 3, some aspects of a non-limiting example of auxiliary turbine system 22 in accordance with an embodiment of the present invention are schematically depicted. In one form, auxiliary turbine system 22 includes an auxiliary turbine 60, a valve 62, a controller 64, inlet ducting 66 and 68, and exhaust ducting 70. In one form, auxiliary turbine 60 is mechanically coupled to accessory gearbox 23 via a shaft 72, and is coupled to compressor 32 via accessory gearbox 23. In other embodiments, auxiliary turbine 60 may be coupled to compressor 32 or one or more other HP spool 24 components, e.g., shafting system 54, via other mechanical arrangements.

In one form, Inlet ducting 66 is coupled to a plenum 74 at one end, and is coupled to valve 62 at the other end. Plenum 74 is disposed between the outlet of HP turbine 38 and the inlet of LP turbine 40, and is operative to receive a portion of the core gas flow exiting HP turbine 38 for use by auxiliary turbine 60. In other embodiments, the portion of core gas flow for use by auxiliary turbine 60 may be obtained from one or more other turbine stages, in addition to or in place of the HP turbine 38 outlet. In addition, in other embodiments, the portion of core gas flow for use by auxiliary turbine 60 may be obtained via other arrangements, which may or may not employ the use of a plenum for the extraction of the portion of the core gas flow for auxiliary turbine 60, depending upon the needs of the particular application.

Inlet ducting 68 is coupled to valve 62 at one end, and to the inlet of auxiliary turbine 60 at the other end. In one form, portions of inlet ducting 68 that pass through bypass duct 30 are disposed within an aerodynamic strut 76 in order to minimize losses. In other embodiments, other arrangements may be employed. Exhaust ducting 70 is coupled to the outlet of auxiliary turbine 60 at one end, and is configured to direct the exhaust from auxiliary turbine 60 into bypass duct 30 at the other end for conversion to thrust, e.g., via nozzle 42B. In other embodiments, auxiliary turbine system 22 may be configured to discharge the auxiliary turbine 60 exhaust flow to other locations, for example and without limitation, into nozzle 42A or overboard engine 20. Although the depicted embodiment envisions the use of inlet ducting 66, inlet ducting 68 and exhaust ducting 70 as set forth herein, other embodiments may employ other arrangements to channel flow to and from valve 62 and auxiliary turbine 60. In addition, although depicted embodiment envisions auxiliary turbine 60 being disposed outside of bypass duct 30, in other embodiments, auxiliary turbine 60 may be disposed in other locations, including radially inward of bypass duct 30, inside bypass duct 30, or upstream or downstream of bypass duct 30.

Valve 62 is configured to regulate the portion of the core gas flow that is received by auxiliary turbine 60. In one form, valve 62 is configured to modulate the portion of the core gas flow received by auxiliary turbine 60 between a minimum flow amount and a maximum flow amount in accordance with the needs of the particular application. Valve 62 is also configured to close to prevent flow to auxiliary turbine 60. Valve 62 is controlled by controller 64 to selectively allow or disallow flow through valve 62. Valve 62 may take any suitable form, and may be, for example and without limitation, a butterfly valve, a gate valve, a poppet valve or any other suitable valve type. Valve 62 is actuated by an actuation mechanism (not shown) under the direction of controller 64.

Controller 64 is communicatively coupled to valve 62 via a communications link 78. Communications link 78 may take any suitable form, and may be, for example, a wired and/or wireless and/or optical link capable of transmitting control signals to valve 62. In some embodiments, valve 62 may provide feedback information to controller 64 indicative of valve position, in which case communications link 78 is also configured to transmit feedback signals to controller 64 from valve 62. In some embodiments, communications link 78 may also be configured to provide electrical power for actuating valve 62.

Controller 64 is configured to execute program instructions to control valve 62 to selectively prevent or allow flow to auxiliary turbine 60, and to regulate the flow rate to a desired level during engine 20 operations where such flow is desired. The flow regulation, including starting and stopping flow to auxiliary turbine 60 may be based on, for example and without limitation, one or more lookup tables and/or rate schedules, and/or may be based on, for example and without limitation, sensed and/or calculated engine 20 parameters, engine 20 inlet conditions, aircraft 10 speed and/or power lever angle.

In one form, controller 64 is microprocessor based and the program instructions are in the form of software stored in a memory (not shown). However, it is alternatively contemplated that controller 64 and the program instructions may be in the form of any combination of software, firmware and hardware, including state machines, and may reflect the output of discreet devices and/or integrated circuits, which may be co-located at a particular location or distributed across more than one location, including any digital and/or analog devices configured to achieve the same or similar results as a processor-based controller executing software or firmware based instructions. In other embodiments, controller 64 may not be configured with the level of functionality associated with a processor-based controller, but rather may be a simple controller configuration. In one form, controller 64 is a gas turbine engine controller, such as a full authority digital electronic control (FADEC) unit. In other embodiments, controller 64 may take any suitable form, and in some embodiments may be a dedicated controller for operating valve 62.

During aircraft 10 takeoff, the power (thrust) output of engine 20 is enhanced by employing auxiliary turbine system 22 to expand turbine flow capacity by opening valve 62 to allow a portion of core gas flow to flow through auxiliary turbine 60. Auxiliary turbine 60 extracts power from the gas flow and transmits the power via accessory gearbox 23 to compressor 32, thereby increasing the output of compressor 32, and hence engine 20. The exhaust gas from auxiliary turbine 60 is directed into bypass duct 30, from where it will contribute to the thrust output of engine 20. During some operating conditions, such as aircraft 10 takeoff, controller 64 may command valve 62 to open fully, thereby providing a maximum flow to auxiliary turbine 20, yielding a higher takeoff power output by engine 20 than a similar engine not equipped with auxiliary turbine system 22. The amount by which valve 62 opens may vary with conditions, for example and without limitation, ambient/inlet conditions. During other operating conditions of aircraft 10 that require high thrust levels, controller 64 may command valve 62 to open partially or fully, e.g., depending operating conditions and/or pilot input. During cruise conditions, including supercruise flight, controller 64 may command valve 62 to close fully, thereby contracting the turbine flow capacity of engine 20, which may result in increased fuel efficiency, as engine 20 is effectively operating closer to design point at the cruise power condition.

Embodiments of the present invention include a variable cycle gas turbine engine, comprising: a compressor configured to compress a core gas flow; a combustor in fluid communication with the compressor and configured to combust the core gas flow; a primary turbine drivingly coupled to the compressor and configured to receive the core gas flow, wherein the primary turbine is configured to drive the compressor; an auxiliary turbine drivingly coupled to the compressor; and a valve configured to selectively direct a portion of the core gas flow to the auxiliary turbine, wherein the auxiliary turbine is configured to extract power from the portion of the core gas flow and supply the power to the compressor when the valve is open.

In a refinement, the valve is in fluid communication with the primary turbine and operative to receive the portion of the core gas flow from the primary turbine.

In another refinement, the valve is configured to modulate the portion of the core gas flow between a minimum flow amount and a maximum flow amount.

In yet another refinement, the valve is configured to close to prevent flow to the auxiliary turbine.

In still another refinement, the valve is operative to open during a takeoff power condition of the engine.

In yet still another refinement, the valve is operative to close during a cruise power condition of the engine.

In a further refinement, the compressor is a variable compressor.

In a yet further refinement, the variable cycle gas turbine engine further comprises a fan and a fan bypass duct in fluid communication with the fan, wherein variable cycle gas turbine engine is configured to direct the exhaust of the auxiliary turbine into the fan bypass duct.

In a still further refinement, the variable cycle gas turbine engine further comprises an accessory gearbox coupled to the compressor, wherein the auxiliary turbine is drivingly coupled to the compressor via the accessory gearbox.

Embodiments of the present invention include a variable cycle gas turbine engine, comprising: a compressor configured to compress a core gas flow; a combustor in fluid communication with the compressor and configured to combust the core gas flow; a primary turbine drivingly coupled to the compressor and configured to receive the core gas flow, wherein the primary turbine is configured to drive the compressor; and an auxiliary turbine system having an auxiliary turbine drivingly coupled to the compressor, wherein the auxiliary turbine system is configured to selectively receive a portion of the core gas flow; generate shaft power using the portion of the core gas flow; and supply the shaft power to the compressor.

In a refinement, the auxiliary turbine system includes a valve configured to selectively direct a portion of the core gas flow to the auxiliary turbine.

In another refinement, the primary turbine is a high pressure turbine; and wherein the valve is in fluid communication with the discharge of the high pressure turbine, and is operative to receive the portion of the core gas flow from the discharge of the high pressure turbine.

In yet another refinement, the valve is configured to modulate the portion of the core gas flow between a minimum flow amount and a maximum flow amount.

In still another refinement, the variable cycle gas turbine engine further comprises a low pressure turbine; a fan driven by the low pressure turbine; and a fan bypass duct in fluid communication with the fan, wherein variable cycle gas turbine engine is configured to direct the exhaust of the auxiliary turbine into the fan bypass duct.

In yet still another refinement, the variable cycle gas turbine engine is configured wherein the portion of the core gas flow is received by the auxiliary turbine from upstream of the low pressure turbine.

In a further refinement, the variable cycle gas turbine engine further comprises an accessory gearbox coupled to the compressor, wherein the auxiliary turbine is drivingly coupled to the compressor via the accessory gearbox.

In a yet further refinement, the compressor is a variable geometry compressor.

Embodiments of the present invention include a variable cycle gas turbine engine, comprising: a compressor configured to compress a core gas flow; a combustor in fluid communication with the compressor and configured to combust the core gas flow; a turbine drivingly coupled to the compressor and configured to receive the core gas flow, wherein the turbine is configured to drive the compressor; and means for selectively expanding and contracting a turbine flow capacity.

In a refinement, the means for selectively expanding and contracting the turbine flow capacity includes an auxiliary turbine system having an auxiliary turbine drivingly coupled to the compressor, wherein the auxiliary turbine system is configured to selectively receive a portion of the core gas flow; generate shaft power using the portion of the core gas flow; and supply the shaft power to the compressor.

In another refinement, the means for selectively expanding and contracting the turbine flow capacity includes a valve configured to selectively direct a portion of the core gas flow to the auxiliary turbine.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A variable cycle gas turbine engine, comprising:
   a compressor configured to compress a core gas flow;
   a combustor in fluid communication with the compressor and configured to combust the core gas flow;
   a primary turbine drivingly coupled to the compressor and configured to receive the core gas flow, wherein the primary turbine is configured to drive the compressor;
   an auxiliary turbine drivingly coupled to the compressor;
   a valve configured to selectively direct a portion of the core gas flow to the auxiliary turbine; and
   a controller structured to selectively operate the valve such that the portion of the core gas flow is directed to the auxiliary turbine,
   wherein the auxiliary turbine is configured to extract power from the portion of the core gas flow and supply the power to the compressor when the valve is open through action of the controller;
   wherein the controller is configured to selectively operate the valve according to at least one of a look-up table, a rate schedule, sensed or calculated engine parameters, engine inlet conditions, aircraft speed and power lever angle.

2. The variable cycle gas turbine engine of claim 1, wherein the valve is in fluid communication with the primary turbine and operative to receive the portion of the core gas flow from the primary turbine.

3. The variable cycle gas turbine engine of claim 1, wherein the valve is configured to modulate the portion of the core gas flow between a minimum flow amount and a maximum flow amount.

4. The variable cycle gas turbine engine of claim 1, wherein the valve is configured to close to prevent flow to the auxiliary turbine.

5. The variable cycle gas turbine engine of claim 1, wherein the valve is operative to open during a takeoff power condition of the engine.

6. The variable cycle gas turbine engine of claim 1, wherein the valve is operative to close during a cruise power condition of the engine.

7. The variable cycle gas turbine engine of claim 1, wherein the compressor is a variable compressor.

8. The variable cycle gas turbine engine of claim 1, further comprising a fan and a fan bypass duct in fluid communication with the fan, wherein variable cycle gas turbine engine is configured to direct the exhaust of the auxiliary turbine into the fan bypass duct.

9. The variable cycle gas turbine engine of claim 1, further comprising an accessory gearbox coupled to the compressor, wherein the auxiliary turbine is drivingly coupled to the compressor via the accessory gearbox.

10. A variable cycle gas turbine engine, comprising:
    a compressor configured to compress a core gas flow;
    a combustor in fluid communication with the compressor and configured to combust the core gas flow;
    a primary turbine drivingly coupled to the compressor and configured to receive the core gas flow, wherein the primary turbine is configured to drive the compressor; and
    an auxiliary turbine system having an auxiliary turbine drivingly coupled to the compressor, wherein the auxiliary turbine system is configured to selectively receive a portion of the core gas flow; generate shaft power using the portion of the core gas flow; and supply the shaft power to the compressor,
    wherein the auxiliary turbine system includes a controller and a valve, the controller structured to operate the valve between an open position and a closed position, the valve configured to selectively direct the portion of the core gas flow to the auxiliary turbine;
    wherein the controller is configured to selectively operate the valve according to at least one of a look-up table, a rate schedule, sensed or calculated engine parameters, engine inlet conditions, aircraft speed and power lever angle.

11. The variable cycle gas turbine engine of claim 10, wherein the primary turbine is a high pressure turbine; and wherein the valve is in fluid communication with a discharge of the high pressure turbine, and is operative to receive the portion of the core gas flow from the discharge of the high pressure turbine.

12. The variable cycle gas turbine engine of claim 10, wherein the valve is configured to modulate the portion of the core gas flow between a minimum flow amount and a maximum flow amount.

13. The variable gas turbine engine of claim 10; further comprising a low pressure turbine; a fan driven by the low pressure turbine; and a fan bypass duct in fluid communication with the fan, wherein variable cycle gas turbine engine is configured to direct an exhaust of the auxiliary turbine into the fan bypass duct.

14. The variable cycle gas turbine engine of claim 13, configured wherein the portion of the core gas flow is received by the auxiliary turbine from upstream of the low pressure turbine.

15. The variable cycle gas turbine engine of claim 10, further comprising an accessory gearbox coupled to the compressor, wherein the auxiliary turbine is drivingly coupled to the compressor via the accessory gearbox.

16. The variable cycle gas turbine engine of claim 10, wherein the compressor is a variable geometry compressor.

* * * * *